United States Patent [19]
Hellermann

[11] Patent Number: 6,063,853
[45] Date of Patent: *May 16, 2000

[54] TIRE TREADS HAVING LOW ROLLING RESISTANCE AND IMPROVED ABS BRAKING

[75] Inventor: Walter Hellermann, Dorsten, Germany

[73] Assignee: Huels Aktiengesellschaft, Marl, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/832,549

[22] Filed: Apr. 2, 1997

[30] Foreign Application Priority Data

Apr. 2, 1996 [DE] Germany .............. 196 13 193

[51] Int. Cl.⁷ ..................................... C08K 3/00
[52] U.S. Cl. ............... 524/495; 524/505; 525/95; 525/99
[58] Field of Search ................. 524/495, 505; 525/95, 99

[56] References Cited

U.S. PATENT DOCUMENTS

| | | | |
|---|---|---|---|
| 4,745,150 | 5/1988 | Ida et al. | 524/505 |
| 4,981,911 | 1/1991 | Herrmann et al. | 525/258 |
| 5,096,973 | 3/1992 | Herrmann et al. | 525/314 |

*Primary Examiner*—Edward J. Cain
*Attorney, Agent, or Firm*—Oblon, Spivak, McClelland, Maier & Neustadt, P.C.

[57] ABSTRACT

Some rubbers exhibit poor wet skid behavior during ABS braking. The wet skid behavior is substantially improved by the blends, according to the invention, of integral rubber and natural rubber. The rolling resistance is not adversely affected.

12 Claims, No Drawings

TIRE TREADS HAVING LOW ROLLING RESISTANCE AND IMPROVED ABS BRAKING

BACKGROUND OF THE INVENTION

1. Field of the Invention

The present invention relates to tire tread based on polydiene rubbers.

2. Discussion of the Related Art

The tire treads occupy a special place among the structural components of the tire. This is due in particular to the fact that the tire tread forms the narrow contact surface between vehicle and roadway. The characteristics of a vehicle during driving depend in particular on the type and quality of the tire tread. An optimum tire tread must cover an extensive requirement profile. In addition to high abrasion resistance and all-weather properties, the tire tread should also exhibit good winter properties, such as low rolling resistance. Antiskid properties, in particular on a wet roadway, are very important from the point of view of driving safety. In addition to the conventional braking with blocking, the antiblocking system (ABS), which is increasingly improved and widely used in recent years, is becoming increasingly important also for the development of new tread polymers which must be specially tailored to the particular conditions during ABS braking. EP-A 0 430 617 and EP-A 0 500 338 describe tread rubbers for improved ABS braking, containing the conventional aromatic oils as plasticizers.

The room temperature elasticity is of key importance for assessing the wet skid behavior on a laboratory scale. In the past this test has proven useful for evaluating the wet skid behavior in the case of emulsion SBR.

In order to achieve good braking values, it is necessary to use tread polymers having high damping, i.e, having a particularly low room temperature elasticity. This generally requires the preparation of polymers having a high glass transition temperature according to DE-A-37 24 871. These polymers are unsaturated, elastomeric AB block copolymers containing:

from 40 to 80% of a block A based on butadiene (having a uniformly distributed vinyl group content of from 8 to 60%),
from 60 to 20% of a block B containing:
up to 60% of butadiene,
from 0 to 60% of isoprene, and
from 0 to 45% of styrene,
and where the vinyl content of the diene units, based on total AB block, is from 75 to 90%. Percentages are expressed in weight percent unless otherwise specified.

Copolymers prepared by anionic polymerization and consisting of butadiene and styrene are also suitable. These copolymers (referred to below as solution SBR) consist of a mixture of butadiene and from 15 to 35% of styrene, where the vinyl content of the butadiene units (based on butadiene) is between 35 and 90%.

These block copolymers (integral rubber) or solution SBR have a high glass transition temperature.

In Table 1, this is realized in the case of Example 2 using a typical AB block copolymer B as a model. Compared with the base (Example 1), values of 101 and 116 are obtained with an elasticity of 8 during braking with blocking on asphalt and concrete. However, the drop during ABS braking on asphalt to 84% compared with the base is completely surprising. This means that the wet skid potential incorporated in the integral rubber molecule cannot be realized on the road under slight stresses as represented by ABS braking on asphalt at low speeds.

During braking on concrete, i.e. under higher stress, virtually the same standard is achieved, with a rating of 98%.

SUMMARY OF THE INVENTION

As a complete surprise to a person skilled in the art, it was found that, in spite of a deterioration in the test data, ABS braking is substantially improved by preparing a blend of natural rubber (NR) with a high-$T_G$ rubber ($T_G$ denotes glass transition temperature).

These results are surprising because the blend component, natural rubber, has a low glass transition temperature; thus, a deterioration in the wet skid is expected on addition of natural rubber to the tire tread polymer.

DESCRIPTION OF THE PREFERRED EMBODIMENTS

The preparation of a blend containing 25 phr of NR and 75 phr of a typical AB block copolymer B (Example 3) increases the room temperature elasticity from 8 to 20% compared with Example 2. Nevertheless, braking with blocking under wet conditions is increased to 107% and ABS braking from 84 to 104%. Although the laboratory values further deteriorate, a blend containing 50 phr of NR (Example 4) gives ABS braking of 102% compared with the base. At the same time, the rolling resistance is increased to 102% compared with the base (Example 1). The simultaneous reduction in the Shore A hardness at 0° C. in Examples 3 and 4 leads to an improvement in the winter properties compared with Example 2.

With special high-$T_G$ terpolymers, even better wet skid properties can be achieved both in ABS braking and in braking with blocking by means of blends with natural rubber. Thus, in Example 5, the terpolymer C blended in a ratio of 40 phr of C to 60 phr of natural rubber gives ABS braking of 113% compared with the base (Example 1). With 60 phr of terpolymer C and 40 phr of a natural rubber (Example 6), an improvement of 22% is found in ABS braking compared with the base.

AB and ABC block copolymers based on butadiene, isoprene and styrene or butadiene and styrene are preferably used. The following may be mentioned as examples. All percentages are expressed in weight percent unless otherwise specified.

AB Block Copolymer

An AB block copolymer contains:
from 40 to 80% of a block A based on butadiene
(having a uniformly distributed vinyl group content of from 8 to 60%),
from 60 to 20% of a block B based on
up to 60% of butadiene,
from 0 to 60% of isoprene and
from 0 to 45% of styrene,
where the vinyl content of the diene units, is from 75 to 90%. The butadiene content of block B is preferably from 5 to 60%.

The AB block copolymer preferably contains:
from 50 to 75% of 1,3-butadiene,
from 5 to 35% of isoprene and
from 5 to 25% of styrene.

ABC Block Copolymer

An ABC block copolymer contains:
from 40 to 75% of a block A of butadiene and styrene and/or isoprene units having a vinyl or isopropylene group content (V) of less than 15%, from 5 to 25% of a block B of butadiene and styrene and/or isoprene units (V>70%); or from 5 to 25% of a block B' of styrene, isoprene and, optionally, butadiene units (V<15%); and from 20 to 55% of a block C of styrene, isoprene and, optionally, butadiene units (V>70%);or the isolated B block (=terpolymer) from the AB block copolymers containing:
up to 60% of butadiene,
from 0 to 60% of isoprene and
from 0 to 45% of styrene, where the vinyl content of the diene units, based on the total block copolymer, is from 50 to 90%. The preferred butadiene content of the isolated B block is from 5 to 60%.

Copolymers of Butadiene and Styrene
with from 65 to 85% of 1,3-butadiene
and from 35 to 15% of styrene
are also preferred, where the vinyl content of the diene units, based on the total copolymer, is between 35 and 90%.

Thus, it is an object of the present invention to provide a tire tread composition based on integral rubber which has a room temperature elasticity of between 5 and 35% (at 22° C.), to form a tread rubber; the tread rubber is blended with natural rubber and conventional additives; the tire tread comprising the above blend exhibits substantially improved rolling resistance and wet skid behavior during ABS braking.

The blend ratio with natural rubber and an integral rubber may be:
from 10 to 60 phr of natural rubber and
from 90 to 40 phr of integral rubber.

The process for the preparation of an AB or ABC block copolymer by anionic polymerization of the monomers in an inert organic solvent in the presence of an organolithium compound and of a cocatalyst comprises first preparing a block A by polymerization of butadiene in the absence of a cocatalyst. A block B is then prepared either by polymerizing butadiene and isoprene in the absence of a cocatalyst and if required in the presence of styrene or by continuing the polymerization of butadiene in the presence of a cocatalyst. A mixture of butadiene and isoprene and, optionally, styrene is then polymerized in the presence of a cocatalyst to form block C.

It is in principle possible to add the amounts of monomers required in each case for the preparation of each block to the reaction vessel at the beginning of the polymerization of the block. However, it is also possible to introduce initially the total amount of butadiene at the beginning of the polymerization of block A and to begin block B by adding the cocatalyst or the isoprene. The same considerations are applicable to the addition of the isoprene. The concomitant use of styrene as a comonomer for blocks B and/or C is preferred.

The preparation process for the AB or ABC block copolymers will be described in detail below.

An inert organic solvent is used as the reaction medium. Hydrocarbons having 6 to 12 carbon atoms, such as pentane, hexane, heptane, octane and decane, and cyclic analogs thereof are particularly suitable. Aromatic solvents, such as, for example, benzene, toluene, xylenes, etc., are also suitable. Mixtures of the solvents described above can of course also be used.

Alkyllithium compounds which are readily obtainable by reacting lithium with the corresponding alkyl halides are used as the catalyst. The alkyl radicals have 1 to 10 carbon atoms. Individual hydrogen atoms may be substituted by phenyl radicals. The following alkyllithium compounds are particularly suitable: methyllithium, ethyllithium pentyllithium and n-butyllithium; n-butyllithium is preferred.

In order to improve the cold flow, at least one polymerization stage is advantageously carried out in the presence of small amounts of a branching agent, such as, for example, divinylbenzene (DVB). Not more than 0.5 part of DVB is used per 100 parts of monomers. Such an addition is omitted if coupling is envisaged after the polymerization.

The type and amount of catalyst and branching agent are in general chosen so that the block copolymer obtained has the following properties:

| | |
|---|---|
| Mooney viscosity (ML$_{1-4}$, 100° C., DIN 53 523) | 35 to 120 |
| Nonuniformity U = (Mw/Mn) − 1, determined by analysis by gel permeation chromatography (GPC analysis) | 0.6 to 3.0 |
| Deformation elasticity (80° C., DIN 53 514) | ≧20 |

In the present process, block B is prepared in the presence of a cocatalyst.

In this case, it is of interest to obtain a polymer having as high a proportion as possible of 1,2 and/or 3,4 structural units:

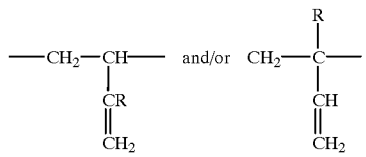

where R=H (butadiene) or R=CH$_3$ (isoprene).

The choice of the cocatalysts therefore depends on their ability to regulate the microstructure, i.e. to steer the course of the polymerization toward as complete formation as possible of 1,2 and/or 3,4 structural units.

The cocatalyst is generally selected from the group consisting of an ether, a tertiary amine and an ether- containing tertiary amine.

Mixtures of different cocatalysts can of course also be used.

Suitable ethers comprise in particular dialkyl ethers of ethylene glycol and of diethylene glycol, whose alkyl groups each have up to 4 carbon atoms, such as ethylene glycol diethyl ether (DEE).

In the preparation of branched block copolymers, ethers of the general formula are preferred:

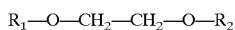

where R$_1$ and R$_2$ are alkyl radicals, including, but not limited to, methyl, ethyl, n-propyl, isopropyl, n-butyl, isobutyl, sec-butyl and tert-butyl. Further R$_1$ and R$_2$ differ from each other by having different number of carbon atoms. The sum of the carbon atoms of the two radicals R$_1$ and R$_2$ is preferably from 5 to 7, more preferably 6. A particularly suitable ethylene glycol ether is the compound in which R$_1$=ethyl and R$_2$=tert-butyl. The glycol ethers are obtained, for example, according to the principle of the Williamson synthesis, from a sodium alcoholate and an alkyl halide. The ethers of the formula

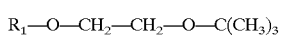

can be prepared in a simple manner by reacting the corresponding alcohol

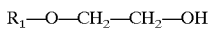
R$_1$—O—CH$_2$—CH$_2$—OH with isobutene in the presence of an acidic ion exchanger; acidic ion exchangers are described for instance in Kirk-Other Encyclopedia of Chemical Technology, Volume 13, pages 685–686 and include by way of non limiting example, acrylic and methacrylic acid that have been cross-linked with a difunctional monomer, e.g. divinyl benzene.

Suitable tertiary amines are, for example, N, N, N', N'-tetramethylethylenediamine, N,N,N',N'-tetraethylethylenediamine and triethylene diamine.

Suitable ether-containing amines are N-methylmorpholine and N-ethylmorpholine.

The cocatalyst is used in a ratio of from 2:1 to 30:1, preferably from 2:1 to 15:1, based on the number of moles of the catalyst. At higher temperatures, larger amounts of cocatalyst are generally required in order to achieve the desired microstructure regulation. Reaction temperatures of 100° C. should not be exceeded. It is also possible to work with increasing or decreasing temperature, however, in this case it is necessary to ensure that the microstructure is not fundamentally changed.

In the preparation of block A, the amount of cocatalyst which should be present depends on the desired vinyl group content.

In the preparation of block B and optionally A, styrene is added as comonomer. By suitable measures, it should be ensured that the content of polystyrene blocks in the AB block copolymer does not exceed 2% by weight. A method for determining the content of polystyrene blocks is described in the standard work Houben-Weyl "Methoden der Organischen Chemie", Volume 14/1 (1061), page 698.

It is known that some compounds proposed as cocatalysts have properties which suppress the formation of polystyrene blocks. The same properties are possessed by compounds which are referred to as randomizers and are generally potassium salts of alcoholates and organic carboxylic and sulfonic acids.

In a particular embodiment of the process, the "living polymers" present after the end of the polymerization can be reacted with a coupling agent to give branched or star-shaped block copolymers. The term "living polymer" is used to denote a polymer or oligomer containing an ionic end group.

Suitable coupling agents are polyepoxides, such as epoxidized linseed oil; polyisocyanates; polyketones, such as 1,3,6-hexanetrione; polyanhydrides, such as, the dianhydride of pyromellitic acid, and dicarboxylic esters, such as dimethyl adipate. Particularly suitable are:

the tetrahalides of the elements Si, Ge, Sn and Pb, in particular SiCl$_4$;

organic compounds of the general formula R$_n$[SiHal$_3$]$_n$, where "Hal" denotes halogen and where n=1 to 6, in particular n=1 or 2, where R is an n-valent organic radical, for example an aliphatic, cycloaliphatic or aromatic radical having 6 to 16 C atoms, including, by way of example, 1,2,4-tris(2-trichlorosilylethyl) cyclohexane, 1,8-bis(trichlorosilyl) octane and 1-(trichlorosilyl)octane;

organic compounds which contain at least one group, SiHal$_2$, such as dimethylsilyl chloride;

halosilanes of the general formula Si(H)$_m$(Hal)$_{4-m}$ where $3 \geq m \geq 1$; and di- and trivinylbenzenes, such as 1,4-divinylbenzene.

It has proven expedient to use divinylbenzene as the coupling agent.

The process can be carried out both batchwise and continuously.

A hydrocarbon mixture which comprises about 50%-wt. of hexane is used as the solvent. Further components of this hydrogenated C$_6$ cut are in particular pentane, heptane, octane and isomers thereof. The solvent is dried over a molecular sieve of pore diameter 0.4 nm so that the water content is reduced below 10 ppm and is then stripped with N$_2$.

The organic lithium compound is n-butyllithium, which, unless stated otherwise, is used in the form of a 20 percent strength by weight solution in hexane.

Prior to using the monomers isoprene and styrene are refluxed over calcium hydride for 24 hours, distilled off and pretitrated with n-butyllithium in the presence of o-phenanthroline.

The glycol ethers are distilled over calcium hydride and then pretitrated with n-butyllithium in the presence of o-phenanthroline.

The divinylbenzene (DVB) is a mixture of m- and p-divinylbenzene and is used in the form of a 64% strength solution in hexane. The conversion is determined by determining the solids content after evaporation of the solvent and of the residual monomers.

The microstructure is determined by IR spectroscopy.

The percentage of rubber which has a star-shaped structure after reaction with a coupling agent and is distinguished by considerably higher molecular weight than the uncoupled rubber is regarded as the coupling yield. The determination is carried out by gell permeation chromatography (GPC analysis), tetrahydrofuran being used as the solvent and polystyrene as column material. The polymers are characterized by means of a light scattering detector. For this purpose, samples are taken from the reactor before the addition of the coupling agent and at the end of the reaction. The deformation hardness (DH) and the deformation elasticity (DE) are determined by the customary methods of measurement (DIN 53 514).

The oils to be used or any desired combinations of these oils may be characterized as follows (cf. Kautschuk and Gummi Kunststoffe, 39th year No. 9/86, page 816):

|  | Paraffinic | Paraffinic/naphthenic | Naphthenic | Naphthenic/aromatic | Aromatic | Very Aromatic |
|---|---|---|---|---|---|---|
| C$_A$ (aromatic) | <10 | <15 | 0–30 | 25–40 | 35–50 | 50–60 |
| C$_N$ (naphthenic) | 20–30 | 25–40 | 30–45 | 20–45 | 25–40 | <40 |
| C$_P$ paraffinic) | 55–75 | 55–65 | 35–55 | 25–45 | 20–35 | <25 |

C $\hat{=}$ Carbon atom

The above oils may be used in the range from 10 phr to 50 phr, i.e. the amount of oil depends in each case on the amount of active, reinforcing filler used.

The treads according to the invention may contain either aromatic or naphthenic or paraffinic oil or any desired blend from the above-mentioned specifications. Aromatic or naphthenic oil is preferably used. Instead of a conventional active carbon black, a mineral filler (for example silica) or a combination of the two may also be used. The carbon black or silica is used in an amount of from 50 to 90 phr. In the case of blends of the two components (carbon black and silica), the amount of the blend is likewise from 50 to 90 phr.

The tread rubber is prepared according to the general vulcanization mix (see Examples) with 50 phr of carbon black and 10 phr of aromatic oil and is subjected to a laboratory test, where the room temperature elasticity at 22° C. is determined. This may be an integral rubber or any desired blend of the stated rubbers.

If the room temperature elasticity of the mix is between 5 and 35%, the ABS braking can be substantially improved by preparing a blend with natural rubber.

The production of the tire treads is carried out in a manner known per se by mixing the rubber component with the additives. Conventional additives are, for example, carbon black, silica, a plasticizer, an accelerator, antiaging agent, antiozonant or a resin. Mixing is carried out in conventional mixing units, for example kneaders and roll mills. The temperature to be established depends in a known manner on the composition of the compounds and on the method of mixing.

3 parts of aromatic oil
3 parts of zinc oxide
2 parts of stearic acid
2 1 part of VULKANOX® 4010 NA (N-isopropyl-N'-phenyl-p-phenylene-diamine)
1 part of VULKANOX® 4020 (N-(1,3-dimethylbutyl)-N'-phenylenediamine)
1 part of KORESIN® (reaction product of p-tert-butylphenol with acetylene)
1.5 parts of CBS (N-cyclohexyl-1-benzothiazolesulfur amide)
0.2 part of DPG (diphenylquanidine)
2 parts of sulfur Preparation of AB Block Polymer B 275 parts of hexane, 40 parts of 1,3-butadiene and 0.03 part of divinylbenzene (DVB) are initially introduced into a first V2A stainless steel stirred autoclave flushed with dry

TABLE 1

| Example | | 1 Base | 2 | 3 | 4 | 5 | 6 |
|---|---|---|---|---|---|---|---|
| Treat Polymer Composition | | A | B | B | B | C | C |
| Tread Rubber (phr) | | 100 | 100 | 75 | 50 | 40 | 60 |
| NR (phr)[a)] | | — | — | 25 | 50 | 60 | 40 |
| Oil type | Aromatic | 37.5 | 10 | 10 | 10 | 10 | 10 |
| Filler | N-339 | 75 | 50 | 50 | 50 | 50 | 50 |
| Laboratory data | Hardness (Shore A)% at 0° C. | 67 | 99 | 79 | 71 | 88 | 99 |
| | Hardness (Shore A)% at 22° C. | 65 | 68 | 63 | 63 | 61 | 67 |
| | Elasticity (%) at 22° C.[1)] | 29 | 8 | 20 | 34 | 12 | 6 |
| | Elasticity (%) at 75° C.[1)] | 45 | 49 | 53 | 55 | 52 | 42 |
| | Abrasion in mm$^3$ [2)] | 40 | 150 | 149 | 155 | 196 | 216 |
| Tire data [3)] | Braking with blocking | Asphalt[4)] | 100 | 101 | 107 | 100 | 111 | 113 |
| Wet skid | | Concrete[4)] | 100 | 116 | — | — | — | — |
| | ABS braking | Asphalt[5)] | 100 | 84 | 104 | 102 | 113 | 122 |
| | | Concrete[5)] | 100 | 98 | — | — | — | — |
| | Rolling resistance[6)] | 100 | 83 | 94 | 102 | 86 | 82 |

Explanations for Table 1
[1)]Test according to DIN 53 512;
[2)]Test according to DIN 53 516;
[3)]Tire size 195/65 R 15, all ratings relate to the base of Example 1, all values > 100 are better than the base;
[4)]Braking with blocking from speed 50 km/h at air pressure 2.2 bar, wet;
[5)]4-wheel ABS braking from speed 50 km/h, wet;
[6)]Measured on a roller-type test stand at a speed of 110 km/h, air pressure 2.5 kg/cm$^2$, load 330 kg, temperature 35° C., all values > 100 are better than the base;
[a)]Natural rubber or cis-1,4-polyisoprene;

These Examples are also discussed in the priority document German Patent Application 196 13 193.6 which is incorporated herein by reference.

Having generally described this invention, a further understanding can be obtained by reference to certain specific examples which are provided herein for purposes of illustration only and are not intended to be limiting unless otherwise specified.

EXAMPLES

Polymer A (base)

BUNA® HÜLS EM 1712 is a conventional styrene/butadiene rubber extended with 37.5 parts of oil. In contrast to the subsequently stated, general vulcanization mix, BUNA® HÜLS EM 1712 is vulcanized in the following composition:

137.5 parts of BUNA® HÜLS EM 1712
75 parts of carbon black N 339 nitrogen and are titrated with n-butyllithium (Buli) after drying over a molecular sieve (0.4 nm) with thermoelectric monitoring. The polymerization is initiated at 50° C. by adding 0.032 parts of n-butyllithium. In spite of cooling, the temperature increases briefly to not more than 62° C. After 107 minutes, and after the initially introduced 1,3-butadiene was virtually completely reacted, an IR sample is taken and is worked up in the same way as the end product.

Immediately thereafter, the content of a second V2A stainless steel stirred autoclave (40° C.) is added in the course of 100 seconds. This contains a solution of 15 parts of 1,3-butadiene, 30 parts of isoprene and 15 parts of styrene in 190 parts of hexane, which solution has been titrated with n-butyllithium.

Immediately thereafter, 2.0 parts of ethylene glycol dimethyl ether are added. The temperature is kept constant at 50° C. 4 hours after the initiation of the polymerization, the polymerization is stopped by adding a solution of 0.5 parts of 2,2-methylene-bis (4-methyl-6-tert-butylphenol) in 2 parts of moist toluene. The solvent is distilled off with steam and the polymer is dried for 24 hours at 70° C. in a forced-circulation oven.

Microstructure:
Butadiene: 1,4-trans: 23
   1,2: 17
   1,4-cis: 17
Isoprene:
   3,4: 24
   1,4: 3
Styrene: 16

Preparation of Terpolymer C 400 parts of hexane and a monomer mixture comprising 25 parts of 1,3-butadiene, 50 parts of isoprene, 25 parts of styrene, 0.02 part of DVB and 1.0 part of ethylglycol tert-butyl ether are initially introduced into a V2A stainless steel autoclave flushed with dry nitrogen and are titrated with butyllithium after drying over a molecular sieve (0.4 nm) with thermoelectric monitoring. The polymerization is initiated at 40° C. by adding 0.054 part of n-butyllithium. With gentle cooling, the temperature reaches 108° C. after 8 minutes. The batch may continue reacting for 30 minutes at this temperature. After cooling to 50° C., the polymerization is stopped by adding a solution of 0.5 parts of 2,2'-methylene-bis (4-methyl-6-tert-butylphenol) in 2 parts of moist toluene. The solvent is distilled off with steam and the polymer is dried for 24 hours at 70° C. in a forced-circulation oven.

Microstructure:
Butadiene: 1,4-trans: 4
   1,2: 19
   1,4-cis: 7
Isoprene: 3,4: 40
   1,4: 4
Styrene: 26

General Vulcanization Formulation

Vulcanization mixes of the following composition are prepared from the tread rubbers according to the invention (cf. Table 1):
   100 parts of tread rubber
   50 parts of carbon black N 339
   10 parts of aromatic or naphthenic oil
   3 parts of zinc oxide
   1 part of stearic acid
   1 part of N-isopropyl-N'-phenyl-p-phenylenediamine (VULKANOX® 4010 NA)
   1 part of N-(1,3-dimethylbutyl)-N'-phenylenediamine (VULKANOX® 4020)
   1 part of KORESIN®, reaction product of p-tert-butylphenol with acetylene
   1.3 parts of N-cyclohexyl-l-benzothiazolesulfenamide (CBS, VULKACIT® CZ)
   0.3 part of diphenylguanidine (DPG, VULKACIT® DZ)
   1.6 parts of sulfur The products VULKANOX® 4010 NA, VULKANOX® 4020, VULKACIT® CZ and VULKACIT® DZ are available from Bayer AG, Leverkusen, and KORESIN® from BASF AG, Ludwigshafen.

These Examples are also discussed in the priority document German Patent Application 196 13 193.6 which is incorporated herein by reference.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A tire tread composition, comprising:
   (i) a blend of an integral rubber and from 25 to 60 parts of a natural rubber per one hundred parts of blended rubber; from 50 to 90 phr of (ii) carbon black and/or silica and from 10 to 50 phr of (iii) aromatic oil, the amount of each of (ii) and (iii) based on 100 phr of (i); and conventional additives;
   wherein said integral rubber has a room temperature elasticity of 5 to 35% at 22° C.

2. The tire tread of claim 1, wherein said integral rubber comprises:
   from 5 to 60%-wt. of butadiene;
   from 0 to 60%-wt. of isoprene; and
   from 0 to 45%-wt of styrene,
   wherein the vinyl content of the diene units is from 50 to 90%-wt.; and
   wherein said natural rubber has a room temperature elasticity of between 5 and 35%.

3. The tire tread of claim 1, wherein said tire tread comprises an oil selected from the group consisting of aromatic naphthenic and paraffinic oil; and said tire tread comprises a filler selected from the group consisting of carbon black and a mineral filler.

4. The tire tread of claim 1, wherein the blend ratio of integral rubber to natural rubber is from 90:10 to 40:60.

5. A tire comprising a tire tread, said tire tread formed from a composition comprising:
   (i) a blend of an intergal rubber and from 25 to 60 parts of a natural rubber per one hundred pars of blended rubber; from 50 to 90 phr of (ii) carbon black and/or silica and from 10 to 50 phr_of (iii) aromatic oil, the amount of each of (ii) based on 100 phr of (i); and conventional additives;
   wherein said integral rubber has a room temperature elasticity of 5 to 35% at 22° C.

6. The tire tread composition of claim 5, wherein said tire tread contains an oil selected from the group consisting of aromatic naphthenic and paraffinic oil; and said tire tread contains a filler selected from the group consisting of carbon black and a mineral filler.

7. The tire tread composition of claim 5, wherein the blend ratio of integral rubber to natural rubber is from 90:10 to 40:60.

8. A tire tread, comprising:
   as the rubber component (i), a rubber mixture consisting of an integral rubber and from 25 to 60 parts of a natural rubber per one hundred parts of blended rubber, from 50 to 90 phr of (ii) carbon black and/or silica and from 10 to 50 phr of (iii) aromatic oil, the amount of each of (ii) and-(iii) based on 100 phr of (i); and conventional rubber additives;
   wherein said integral rubber has a room temperature elasticity ranging from 5 to 35% at 22° C.

9. A tire tread composition, comprising:
   (i) a blend of an integral rubber component of an AB block copolymer comprising:
      from 40 to 80 wt. % of a block A comprising butadiene and from 8 to 60 wt. % of vinyl groups, based on the total weight of block A, uniformly distributed in said block A;
      from 6 to 20 wt. % of a block B, comprising:
         up to 60 wt. % of butadiene, from 0 to 60 wt. % of isoprene, and from 0 to 45 wt. % of styrene; and wherein the vinyl group content of the diene units ranges from 75 to 90 wt. % based on the total AB block and wherein the AB block copolymer contains from 50 to 75% of 1,3-butadiene, from 5 to 35% of isoprene and 5 to 25% of styrene, said integral rubber having a room temperature elasticity (22° C.) ranging from 5 to 35% and from 25 to 60 parts of a natural rubber per one hundred parts of blended rubber and from 50 to 90 phr of (ii) carbon black and/or silica and from 10 to 50 phr of (iii) aromatic oil, the amount of each of (ii) and (iii) based on 100 phr of (i); and (iv) conventional additives.

10. A tire tread composition comprising:

(i) an integral rubber of an ABC block copolymer comprising:

from 40–75 wt. % of a block A comprising butadiene, styrene and/or isoprene units, wherein block A has a vinyl or isopropylene group content of less than 15 wt. %;

from 5–25 wt. % of a block B comprising butadiene, styrene and/or isoprene units and wherein said block B has a vinyl or isopropylene group content of more than 70 wt. %; or from 5–25 wt. % of a block B' comprising styrene, isoprene and optionally butadiene units, wherein said block B has a vinyl or isopropylene group content of less than 15 wt. %; and from 20–55 wt. % of a block C comprising styrene, isoprene and optionally butadiene units, wherein said block C has a vinyl or isopropylene group of greater than 70 wt. %, said integral rubber having a room temperature elasticity (22° C.) ranging from 5–35%;

(ii) a natural rubber blended therein with component (i); and (iii) conventional additives.

11. A tire comprising a tire tread, said tire tread formed from a composition comprising:

(i) a blend of an integral rubber component of an AB block copolymer comprising:

from 40 to 80 wt. % of a block A comprising butadiene and from 8 to 60 wt. % of vinyl groups, based on the total weight of block A, uniformly distributed in said block A;

from 6 to 20 wt. % of a block B, comprising:

up to 60 wt. % of butadiene, from 0 to 60 wt. % of isoprene, and from 0 to 45 wt. % of styrene; and wherein the vinyl group content of the diene units ranges from 75 to 90 wt. % based on the total AB block and wherein the AB block copolymer contains from 50 to 75% of 1,3-butadiene, from 5 to 35% of isoprene and 5 to 25% of styrene, said integral rubber having a room temperature elasticity (22° C.) ranging from 5 to 35% and from 25 to 60 parts of a natural rubber per one hundred parts of blended rubber and from 50 to 90 phr of (ii) carbon black and/or silica and from 10 to 50 phr of (iii) aromatic oil, the amount of each of (ii) and (iii) based on 100 phr of (i); and (iv) conventional additives.

12. A tire comprising a tire tread, said tire tread formed from a composition comprising:

(i) an integral rubber of an ABC block copolymer comprising:

from 40–75 wt. % of a block A comprising butadiene, styrene and/or isoprene units, wherein block A has a vinyl or isopropylene group content of less than 15 wt. %;

from 5–25 wt. % of a block B comprising butadiene, styrene and/or isoprene units and wherein said block B has a vinyl or isopropylene group content of more than 70 wt. %; or from 5–25 wt. % of a block B' comprising styrene, isoprene and optionally butadiene units, wherein said block B has a vinyl or isopropylene group content of less than 15 wt. %; and from 20–55 wt. % of a block C comprising styrene, isoprene and optionally butadiene units, wherein said block C has a vinyl or isopropylene group of greater than 70 wt. %, said integral rubber having a room temperature elasticity (22° C.) ranging from 5–35%;

(ii) a natural rubber blended therein with component (i); and (iii) conventional additives.

* * * * *